United States Patent
Yang et al.

(10) Patent No.: US 10,466,528 B2
(45) Date of Patent: Nov. 5, 2019

(54) MOTHER PLATE FOR COLOR FILTER SUBSTRATE

(71) Applicants: BOE TECHNOLOGY GROUP CO., LTD., Beijing (CN); BEIJING BOE DISPLAY TECHNOLOGY CO., LTD., Beijing (CN)

(72) Inventors: Tonghua Yang, Beijing (CN); He Feng, Beijing (CN); Jiyu Wan, Beijing (CN); Sikai Zhang, Beijing (CN); Dong Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 57 days.

(21) Appl. No.: 15/678,810

(22) Filed: Aug. 16, 2017

(65) Prior Publication Data

US 2018/0113355 A1 Apr. 26, 2018

(30) Foreign Application Priority Data

Oct. 21, 2016 (CN) .......................... 2016 1 0920262

(51) Int. Cl.
*G02F 1/1335* (2006.01)

(52) U.S. Cl.
CPC .. *G02F 1/133514* (2013.01); *G02F 1/133512* (2013.01); *G02F 1/133516* (2013.01)

(58) Field of Classification Search
CPC ......... G02F 1/133512; G02F 1/133514; G02F 1/133707; G02F 1/134336; G02F 1/136209; G02F 2201/52; G02F 1/133516; G03F 7/0007

See application file for complete search history.

(56) References Cited

U.S. PATENT DOCUMENTS

| 6,310,672 | B1 * | 10/2001 | Koike | G02F 1/133514 349/106 |
| 7,088,407 | B2 * | 8/2006 | Takizawa | G02F 1/133514 349/106 |
| 8,273,423 | B2 * | 9/2012 | Yoshioka | G02B 5/201 347/106 |
| 2006/0114377 | A1 * | 6/2006 | Yen | B82Y 10/00 349/106 |
| 2007/0291385 | A1 * | 12/2007 | Kim | G02B 5/201 359/885 |
| 2015/0338702 | A1 | 11/2015 | Xie | |
| 2018/0113354 | A1 | 4/2018 | Zhang et al. | |

FOREIGN PATENT DOCUMENTS

| CN | 103792720 A | 5/2014 |
| CN | 105388661 A | 3/2016 |
| CN | 105527746 A | 4/2016 |

OTHER PUBLICATIONS

First Office Action for Chinese Application No. 201610920262.9, dated Feb. 25, 2019, 7 Pages.

* cited by examiner

*Primary Examiner* — Huyen L Ngo
(74) *Attorney, Agent, or Firm* — Brooks Kushman P.C.

(57) ABSTRACT

A mother plate for a color filter substrate is provided. The mother plate comprises: a base substrate comprising at least a first region and a second region, wherein each of the first region and the second region comprises a plurality of opening structures defined by a black matrix, sizes of the opening structures in the first region are larger than sizes of the opening structures in the second region.

20 Claims, 3 Drawing Sheets

MOTHER PLATE FOR COLOR FILTER SUBSTRATE

CROSS-REFERENCE TO RELATED APPLICATION

This application claims priority to Chinese Patent Application No. 201610920262.9 filed on Oct. 21, 2016, which is incorporated herein by reference in its entirety.

TECHNICAL FIELD

The present disclosure relates to the field of display technology, in particular to a mother plate for a color filter substrate.

BACKGROUND

With the development of liquid crystal display technology, people have higher and higher demand for end products, and also require types and models of the end products to be diversified. In order to meet requirements of different customers, thin film transistor-liquid crystal displays (TFT-LCDs) are offered in a wide variety of sizes. To improve the utilization of a glass substrate, a method using a multi-model glass (MMG) in which panels having various sizes are disposed within the same mother glass is more and more widely used.

MMG products are often laid out with large-sized display products deposed in a substrate and small-sized products deposed in the remaining portion of the same substrate. Due to different sizes of the products, the sizes of their pixel openings are also significantly different. Moreover, during the manufacturing of panels, the substrates for the different sized display products need to be formed by using a one-step process due to equipment limitations or the impact of production capacity, which results in some adverse events. For instance, during the production of RGB (Red Green Blue) filters in a liquid crystal display panel, after coating a red color resist film, it will form a wall since it has a larger thickness than a black matrix, and under the influence of a surface tension, a green color resist film and a blue color resist film that are coated subsequently are not easy to flow and level out. In addition, the leveling degree of a color resist film has large correlation with the size of the pixel opening of the product. Specifically, the smaller the size of the pixel opening is, the more difficult the color resist film is to flow and level out. Moreover, on the same MMG, for the pixels come in a late order of coating, it is more difficult for the corresponding color resist film to diffuse and level out. Therefore, in the MMG products, a color resist film in a small-sized pixel opening is not easy to flow and level out, and the color resist film in the small-sized pixel opening for which the coating is conducted in a late order of coating is even more difficult to flow and level out. Therefore, during the coating of MMG products in related art, since pixel openings have different sizes in different regions of the substrate, a color resist film in a pixel opening which has a relatively small size and for which coating is conducted in the late order of coating is thicker than a theoretical film, thereby resulting in unqualified products.

SUMMARY

In view of the above, an object of the present disclosure is to provide a mother plate for a color filter substrate, which is capable of solve a problem that an actual film has a thickness different from a desired thickness.

To achieve the above object, the present disclosure provides a mother plate for a color filter substrate, comprising: a base substrate comprising at least a first region and a second region, wherein each of the first region and the second region comprises a plurality of opening structures defined by a black matrix. In the first region, a size of a cross section of at least one of the opening structures at a side close to the base substrate is larger than a size of a cross section of the at least one opening structure at another side away from the base substrate; and/or in the second region, a size of a cross section of at least one of the opening structures at a side close to the base substrate is smaller than a size of a cross section of the at least one opening structure at another side away from the base substrate, wherein the cross sections are parallel to the base substrate.

Optionally, a first opening structure, a second opening structure and a third opening structure are formed in the first region, the first opening structure, the second opening structure and the third opening structure correspond to sub-pixels of different colors respectively, and a size of a cross section of the first opening structure at a side close to the base substrate is larger than a size of a cross section of the first opening structure at another side away from the base substrate.

Optionally, a size of a cross section of the second opening structure at a side close to the base substrate is larger than a size of a cross section of the second opening structure at another side away from the base substrate.

Optionally, the size of the cross section of the second opening structure at the other side away from the base substrate is larger than the size of the cross section of the first opening structure at the other side away from the base substrate.

Optionally, a size of a cross section of the third opening structure at a side close to the base substrate is equal to a size of a cross section of the third opening structure at another side away from the base substrate.

Optionally, the first opening structure corresponds to a blue sub-pixel, the second opening structure corresponds to a green sub-pixel, and the third opening structure corresponds to a red sub-pixel.

Optionally, at least a fourth opening structure, a fifth opening structure and a sixth opening structure are formed in the second region, the fourth opening structure, the fifth opening structure and the sixth opening structure correspond to sub-pixels of different colors respectively, and a size of a cross section of the fourth opening structure at a side close to the base substrate is smaller than a size of a cross section of the fourth opening structure at another side away from the base substrate.

Optionally, a size of a cross section of the fifth opening structure at a side close to the base substrate is smaller than a size of a cross section of the fifth opening structure at another side away from the base substrate.

Optionally, the size of the cross section of the fifth opening structure at the other side away from the base substrate is smaller than the size of the cross section of the fourth opening structure at the other side away from the base substrate.

Optionally, a size of a cross section of the sixth opening structure at a side close to the base substrate is equal to a size of a cross section of the sixth opening structure at another side away from the base substrate.

Optionally, the sixth opening structure corresponds to a red sub-pixel, the fifth opening structure corresponds to a green sub-pixel, and the fourth opening structure corresponds to a blue sub-pixel.

Optionally, in the first region, the size of the cross section of the at least one opening structure at the side close to the base substrate is larger than the size of the cross section of the at least one opening structure at the other side away from the base substrate, and a chamfered edge is arranged at the other side of the at least one opening structure away from the base substrate.

Optionally, in the second region, the size of the cross section of the at least one opening structure at the side close to the base substrate is smaller than the size of the cross section of the at least one opening structure at the other side away from the base substrate, and a protruding edge is arranged at the other side of the at least one opening structure away from the base substrate.

Optionally, a cross section of the protruding edge is of a triangle.

Optionally, a width of the protruding edge extending beyond the opening structure is about 20% to 50% of a thickness of the black matrix in a direction perpendicular to the base substrate.

Optionally, a thickness of the protruding edge in the direction perpendicular to the base substrate is about 20% to 100% of the thickness of the black matrix in the direction perpendicular to the base substrate.

Optionally, a width of the chamfered edge in a direction parallel to the base substrate is about 20% to 50% of the thickness of the black matrix in a direction perpendicular to the base substrate; and a thickness of the chamfered edge in the direction perpendicular to the base substrate is about 20% to 100% of the thickness of the black matrix in the direction perpendicular to the base substrate.

Optionally, a cross section of the black matrix defining the opening structures in the direction perpendicular to the base substrate is of a trapezium, a curved shape or a triangle.

BRIEF DESCRIPTION OF THE DRAWINGS

In order to illustrate the technical solutions of the embodiments of the present disclosure in a clearer manner, the accompanying drawings desired for the embodiments of the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

In order to make the objects, the technical solutions and the advantages of the present disclosure more apparent, the embodiments of the present disclosure will be described hereinafter in a clear and complete manner in conjunction with the drawings of the embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
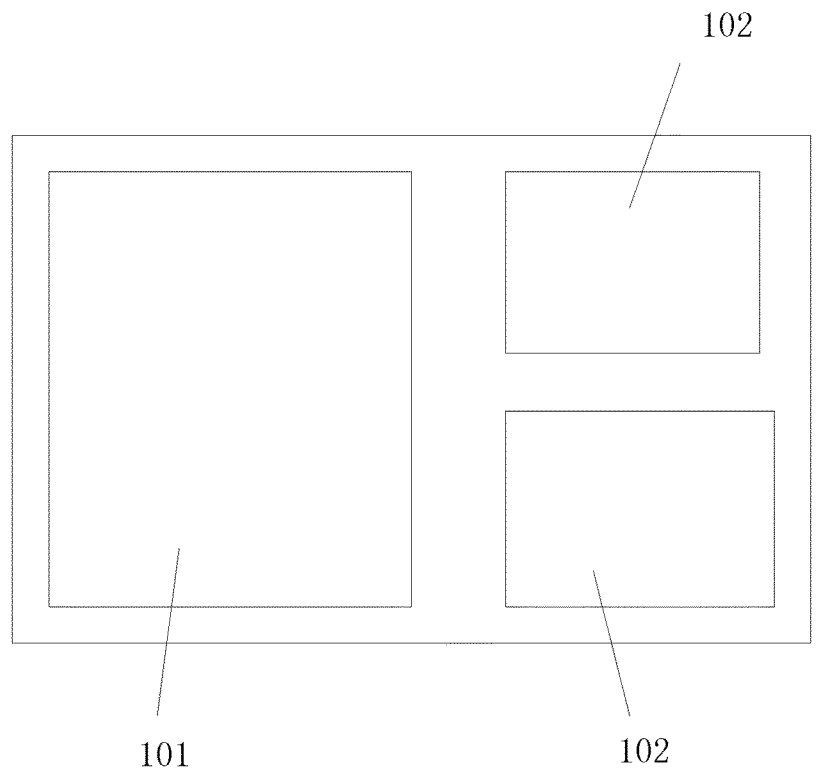
FIG. 1 is a schematic view showing a division of a mother plate for a color filter substrate in an embodiment of the present disclosure.

The present disclosure provides a mother plate for a color filter substrate, which, as shown in FIG. 1, comprises a base substrate that includes at least a first region 101 and a second region 102, the first region 101 and the second region 102 each including a plurality of opening structures defined by a black matrix. The opening structure defined by the black matrix on the substrate provides an accommodation space for subsequent filling of color resist and forms a barrier between regions of different sub-pixels. The opening structures in the first region 101 have a larger size than the opening structures in the second region 102. In the first region 101, a size of a cross section of at least one of the opening structures at a side close to the base substrate is larger than a size of a cross section of the at least one opening structure at another side away from the base substrate; and/or, in the second region 102, a size of a cross section of at least one of the opening structures at a side close to the base substrate is smaller than a size of a cross section of the at least one opening structure at another side away from the base substrate, wherein the cross sections are parallel to the base substrate.

Figure 4:
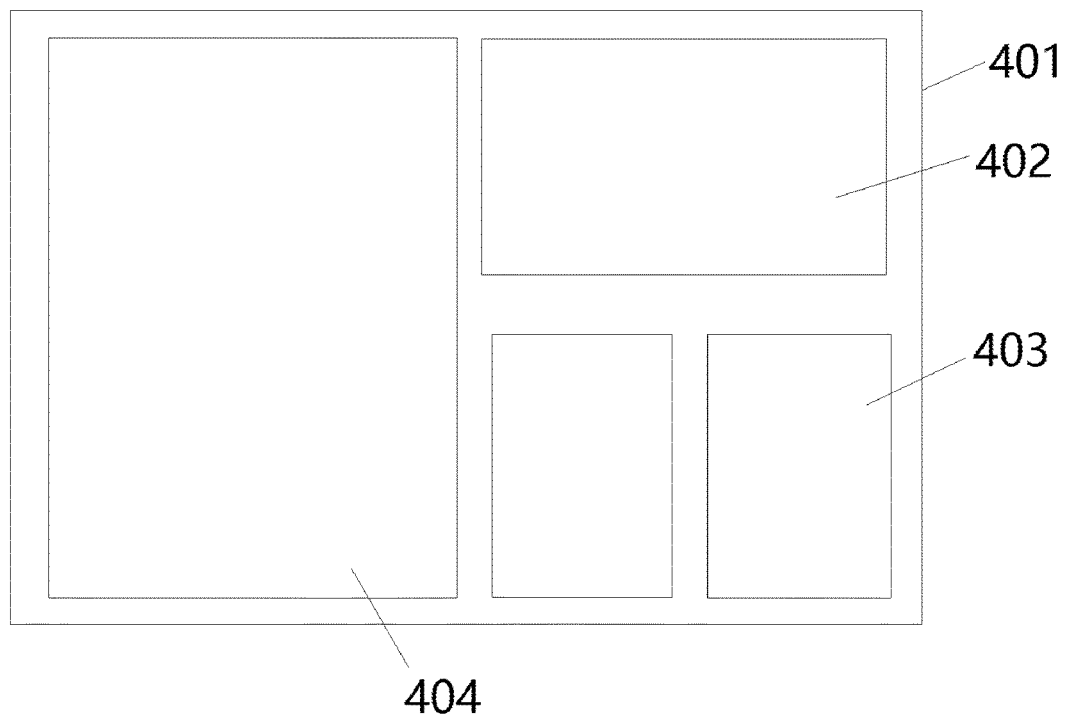
FIG. 4 is a schematic view showing a division of a mother plate for a color filter substrate in another embodiment of the present disclosure.

In some other embodiments of the present disclosure, a MMG color filter substrate includes two or more regions. As shown in FIG. 4, a base substrate 401 includes three different regions 402, 403, 404 formed with different sized opening structures.

As can be seen from the above, the mother plate for a color filter substrate provided in the present disclosure has been optimized for pixel structures of different sized products in the MMG products, openings of black matrix corresponding to different opening structures of the different sized products are designed in different ways, and the opening structures in the first region or the second region on the mother plate for the color filter substrate have been improved. Specifically, in the second region in which the formed films are relatively thick in related art, an opening is increased at a side away from the base substrate such that the coated color resist films in the different sized products have a consistent thickness during the manufacturing, thereby compensating for the thickness difference caused by different pixel openings of the different sized products and achieving the effect that the films of the different sized products in the MMG product have the consistent thickness. As a result, it solves the problem that the thicknesses of the actual films of the different sized products and the desired thickness are inconsistent. Since in the first region, a size of a cross section of at least one of the opening structures at a side close to the base substrate is larger than a size of a cross section of the at least one opening structure at another side away from the base substrate, the volume of the opening is reduced, and the amount of the color resist coated in the first region can thus be reduced.

In a specific embodiment provided in the present disclosure, still referring to FIG. 1, sizes of the opening structures in the first region 101 are larger than sizes of the opening structure in the second region 102. In the first region 101, a size of a cross section of at least one of the opening structures at a side close to the base substrate is larger than a size of a cross section of the at least one opening structure at another side away from the base substrate, and in the second region 102, a size of a cross section of at least one of the opening structures at a side close to the base substrate is smaller than a size of a cross section of the at least one opening structure at another side away from the base substrate, wherein the cross sections are parallel to the base substrate.

Specifically, to eliminate the difference in the film thickness of the different sized products due to the different sized openings, the opening structure where red, green and blue pixels are connected to the black matrix in the different sized products are designed, such that the opening structure for defining a sub-pixel region has a different size at its side away from the base substrate from that at its side close to the base substrate. Specifically, for the opening structure of the large-sized product where red, green, and blue pixels are connected to the black matrix, the opening structure is designed to be wide at the bottom and narrow at the top, and for the opening structure of the small-sized product where red, green, and blue pixels are connected to the black matrix, the opening structure is designed to be wide at the top and narrow at the bottom.

In some embodiments of the present disclosure, in the first region, a size of a cross section of an opening structure corresponding to color resist of at least one color at a side close to the base substrate is larger than a size of a cross section of the opening structure at another side away from the base substrate; or in the second region, a size of a cross section of an opening structure corresponding to color resist of at least one color at a side close to the base substrate is smaller than a size of a cross section of the opening structure at another side away from the base substrate.

Figure 2:
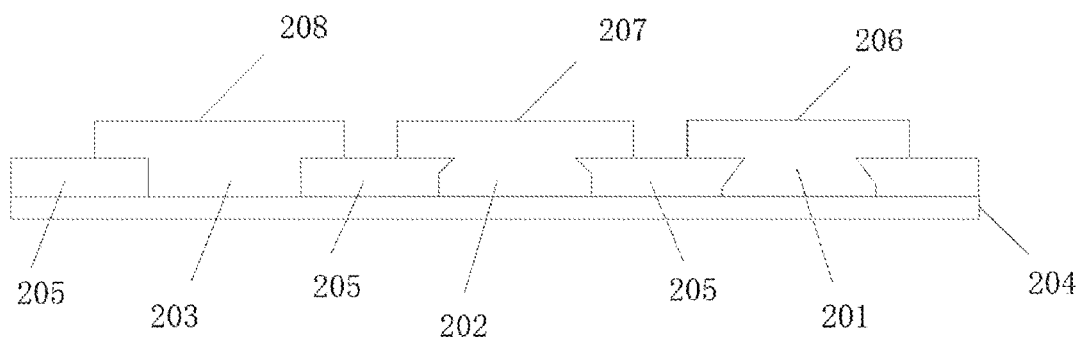
FIG. 2 is a schematic view of opening structures in a first region in the embodiment of the present disclosure.

In some embodiments of the present disclosure, as shown in FIG. 2, the first region is formed with a first opening structure 201, a second opening structure 202 and a third opening structure 203 corresponding to sub-pixels of different colors and defined by a black matrix 205. A size of a cross section of the first opening structure 201 at a side close to the base substrate 204 is larger than a size of a cross section of the first opening structure 201 at another side away from the base substrate 204.

In a specific embodiment, still referring to FIG. 2, the black matrix for defining the first opening structure 201 has a larger width at its side away from the base substrate 204 than at its side close to the base substrate 204.

In some embodiments of the present disclosure, still referring to FIG. 2, a size of a cross section of the second opening structure 202 at a side close to the base substrate 204 is larger than a size of a cross section of the second opening structure 202 at another side away from the base substrate 204.

Figure 5:
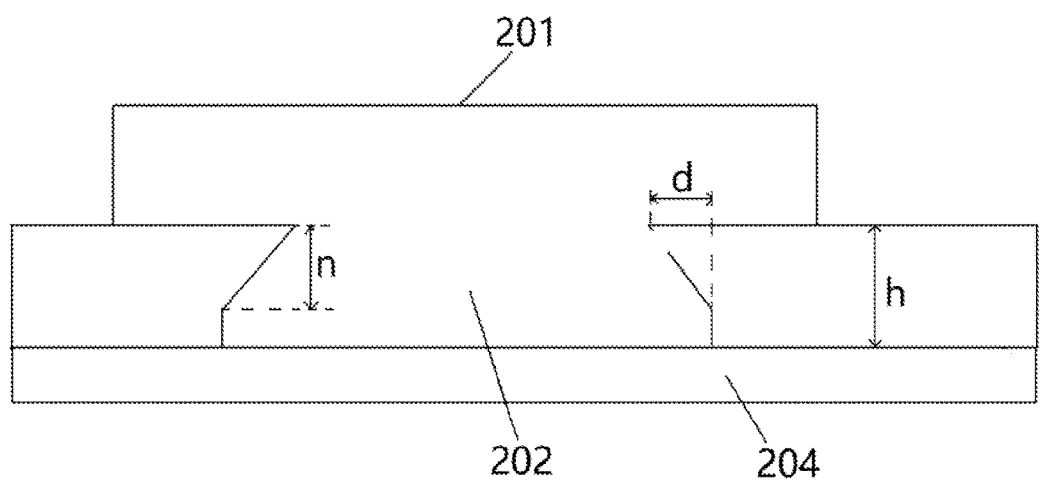
FIG. 5 is an enlarged schematic view of a first opening structure in the first region in the embodiment of the present disclosure.

In some embodiments of the present disclosure, still referring to FIG. 2, the size of the cross section of the second opening structure 202 at the other side away from the base substrate 204 is larger than the size of the cross section of the first opening structure 202 at the other side away from the base substrate 204, as illustrated in the enlarged view shown in FIG. 5. In this way, it is able to appropriately increase the thickness of the color resist in the second opening structure 202, and reduce the difference in thickness between the opening structures in different regions on the substrate. Further, the color resist corresponding to the second opening structure 202 is coated earlier than the color resist corresponding to the first opening structure 201 during the manufacturing. For a substrate with opening structures having larger sizes, the thickness difference between color resist films in different regions on the substrate may be reduced by appropriately increasing the thickness of the color resist films in some opening structures for which the coating is conducted in a late order of coating. As a result, the larger the difference in size between a side of an opening structure away from the base substrate and a side thereof close to the base substrate is, the later the color resist for the opening structure is coated in the order of coating.

In some embodiments of the present disclosure, still referring to FIG. 2, a size of a cross section of the third opening structure 203 at a side close to the base substrate 204 is equal to a size of a cross section of the third opening structure 203 at another side away from the base substrate 204. Further, the color resist corresponding to the third opening structure 203 is coated earlier than the color resists corresponding to the first opening structure 201 and the color resists corresponding to the second opening structure 202 in the order of coating.

In some embodiments of the present disclosure, still referring to FIG. 2, the first opening structure 201 corresponds to a blue sub-pixel 206, the second opening structure 202 corresponds to a green sub-pixel 207, and the third opening structure 203 corresponds to a red sub-pixel 208. In general, the coating of sub-pixels of a color filter substrate follows an order as follows: red sub-pixels, and then green sub-pixels, and then blue sub-pixels. In a general process, the coating order is given as follows: blue color resist, and then green color resist, and then red color resist, and the color resist which is coated in the late order of coating is more likely to be thickened in the small-sized opening. Therefore, in the embodiment of the present disclosure, in the region with the larger openings on the substrate, the side of the opening structure away from the base substrate may be appropriately reduced for the color resist to be coated in the late order of coating, thereby to reduce the thickness difference of the color resists between the different regions due to the different sizes of the openings.

Figure 3:
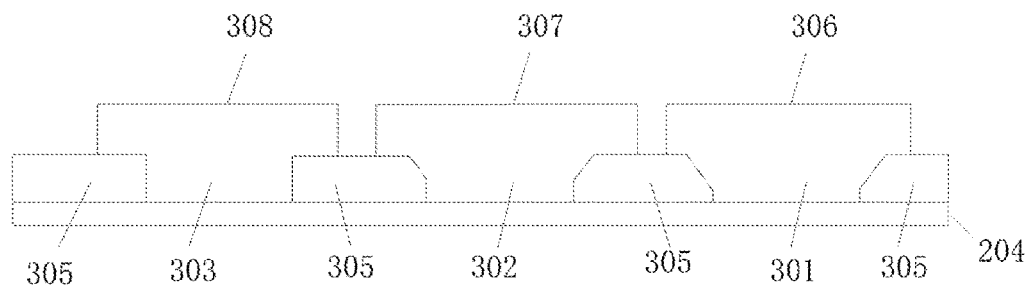
FIG. 3 is a schematic view of opening structures in a second region in the embodiment of the present disclosure.

In some embodiments of the present disclosure, as shown in FIG. 3, the second region is formed with a fourth opening structure 301, a fifth opening structure 302, and a sixth opening structure 303 corresponding to sub-pixels of different colors and defined by a black matrix 305; and a size of a cross section of the fourth opening structure 301 at a side close to the base substrate 204 is smaller than a size of a cross section of the fourth opening structure 301 at another side away from the base substrate 204.

In some embodiments of the present disclosure, still referring to FIG. 3, a size of a cross section of the fifth opening structure 302 at a side close to the base substrate 204 is smaller than a size of a cross section of the fifth opening structure 302 at another side away from the base substrate 204.

In some embodiments of the present disclosure, still referring to FIG. 3, the size of the cross section of the fifth opening structure 302 at the other side away from the base substrate 204 is smaller than the size of the cross section of the fourth opening structure 301 at the other side away from the base substrate 204. A color resist corresponding to the fifth opening structure 302 is coated earlier than a color resist corresponding to the fourth opening structure 301. For a substrate with opening structures having smaller sizes, the thickness difference between color resist films in different regions on the substrate may be reduced by appropriately reducing the thickness of the color resist films in some opening structures for which the coating is conducted in a late order of coating. As a result, the larger the difference in size between a side of an opening structure away from the base substrate and a side thereof close to the base substrate is, the later the color resist for the opening structure is coated in the order of coating.

In some embodiments of the present disclosure, still referring to FIG. 3, a size of a cross section of the sixth opening structure 303 at a side close to the base substrate 204 is equal to a size of a cross section of the sixth opening structure 303 at another side away from the base substrate 204. During the manufacturing, a color resist corresponding to the sixth opening structure 303 is coated earlier than color resists corresponding to the fourth opening structure 301 and color resists corresponding to the fifth opening structure 302 in the order of coating.

In some embodiments of the present disclosure, still referring to FIG. 3, the sixth opening structure 303 corresponds to a red sub-pixel 308, the fifth opening structure 302 corresponds to a green sub-pixel 307, and the fourth opening structure 301 corresponds to a blue sub-pixel 306. In general, the coating of sub-pixels of a color filter substrate follows an order as follows: red sub-pixels, and then green sub-pixels, and then blue sub-pixels. Considering the manufacturing process and the fact that the coating of the pixels follows an order of red sub-pixels, and then green sub-pixels, and then blue sub-pixels, openings of the black matrix at the sub-pixels of different colors are designed differently.

In some embodiment of the present disclosure, in the first region 101, the size of the cross section of the at least one opening structure at the side close to the base substrate is greater than the size of the cross section of the at least one opening structure at the other side away from the base substrate, and a protruding edge is arranged at the other side of the at least one opening structure away from the base substrate.

In some embodiments of the present disclosure, in the second region, the size of the cross section of the at least one opening structure at the side close to the base substrate is smaller than the size of the cross section of the at least one opening structure at the other side away from the base substrate, and a chamfered edge is arranged at the other side of the at least one opening structure away from the base substrate.

The protruding edge or chamfered edge is used to improve the opening structures, which enables the size of the opening structure to be gradually increased or reduced from a side close to the base substrate to a side away from the base substrate, and thus preventing from uneven coating of the color resist which occurs due to the sudden change in the size of the opening structure. Meanwhile, the size of the opening structure at the side close to the base substrate is same as an original size of the opening structure of the related art, and thus the size of the sub-pixel region defined by the opening structure will not be changed visually.

In some embodiments of the present disclosure, a cross section of the protruding edge is of a triangle.

In some other embodiments of the present disclosure, a cross section of the black matrix defining the opening structures in the direction perpendicular to the base substrate is of a trapezium, a curved shape, a triangle or the like.

In some embodiments of the present disclosure, referring to FIG. 5, a width d of the protruding edge extending beyond the opening structure is about 20% to 50% of a thickness h of the black matrix in a direction perpendicular to the base substrate. Specifically, the width of the protruding edge extending beyond the opening structure is a distance that the protruding edge extending beyond an edge of the black matrix. In this way, the thickness of the color resist in the opening structure can be changed without producing any change in the opening structure visually, and thus the display effect will not be adversely affected.

Figure 6:
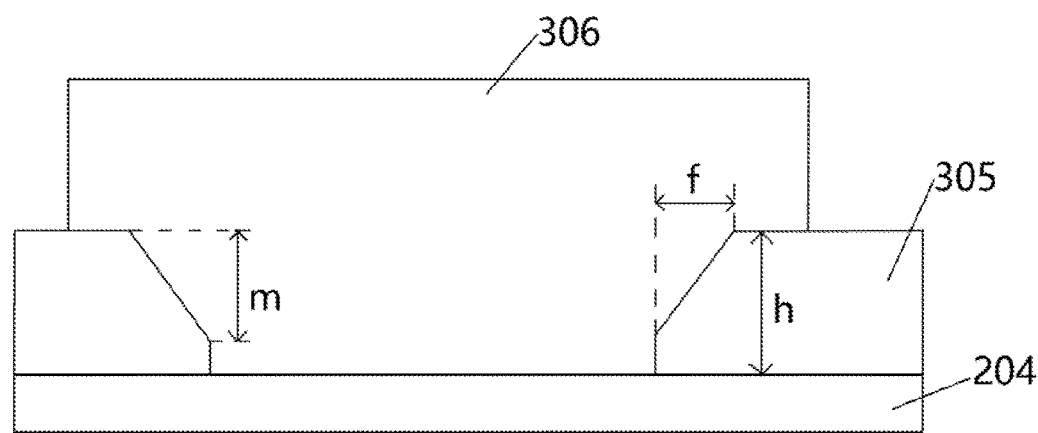
FIG. 6 is an enlarged schematic view of a fourth or fifth opening structure in the second region in the embodiment of the present disclosure.

Optionally, referring to FIG. 6, a width f of the chamfered edge within the opening structure is about 20% to 50% of the thickness of the black matrix in a direction perpendicular to the base substrate. Specifically, the width of the chamfered edge within in opening structure is a horizontal distance from an end of the chamfered edge and the edge of the black matrix. In this way, the thickness of the color resist in the opening structure can be changed without producing any change in the opening structure visually, and thus the display effect will not be adversely affected.

In some embodiments of the present disclosure, as shown in FIG. 5, a thickness n of the protruding edge in the direction perpendicular to the base substrate is about 20% to 100% of the thickness h of the black matrix in the direction perpendicular to the base substrate; as shown in FIG. 6, a thickness m of the chamfered edge in the direction perpendicular to the base substrate is about 20% to 100% of the thickness h of the black matrix in the direction perpendicular to the base substrate. As a result, it is able to change the thickness of the color resist in the opening structures.

As can be seen from the above, in the mother plate for a color film substrate provided in the present disclosure, by changing the opening structures defined by the black matrix, the thickness of the color resist film in the large-sized opening structure is appropriately increased, and the thickness of the color resist film in the small-sized opening structure is appropriately reduced, thereby to eliminate the difference in film thickness created when coating the color resists on the color filter substrate due to the different sizes of the products, and solve the problem of inconsistency between the film thicknesses due to the sequence of coating. Furthermore, since the color resist film being coated late in the sequence is prevented from being too thick, it is able to reduce the amount of the color resist to be used in the present disclosure, thereby to reduce the production cost.

It should be appreciated that, the embodiments described in the specification of the present disclosure are merely for illustrating and explaining the present disclosure, and not for limiting purpose. Moreover, the embodiments and features in the embodiments in the present disclosure can be combined with each other if no conflict occurs.

Obviously, a person skilled in the art may make further modifications and improvements without departing from the spirit of the present disclosure, and these modifications and improvements shall also fall within the scope of the present disclosure.

What is claimed is:

1. A mother plate for a color filter substrate, comprising: a base substrate comprising at least a first region and a second region, wherein each of the first region and the second region comprises a plurality of opening structures defined by a black matrix, sizes of the opening structures in the first region are larger than sizes of the opening structures in the second region, in the first region, a size of a cross section of at least one of the opening structures at a side close to the base substrate is larger than a size of a cross section of the at least one opening structure at another side away from the base substrate; or in the second region, a size of a cross section of at least one of the opening structures at a side close to the base substrate is smaller than a size of a cross section of the at least one opening structure at another side away from the base substrate; or in the first region, the size of the cross section of the at least one opening structure at the side close to the base substrate is larger than the size of the cross section of the at least one opening structure at the other side away from the base substrate; and in the second region, the size of the cross section of the at least one opening structure at the side close to the base substrate is smaller than the size of the cross section of the at least one opening structure at the other side away from the base substrate, wherein the cross sections are parallel to the base substrate.

2. The mother plate according to claim 1, wherein at least a first opening structure, a second opening structure and a third opening structure are formed in the first region, the first opening structure, the second opening structure and the third opening structure correspond to sub-pixels of different colors respectively, and a size of a cross section of the first opening structure at a side close to the base substrate is larger than a size of a cross section of the first opening structure at another side away from the base substrate.

3. The mother plate according to claim 2, wherein a size of a cross section of the second opening structure at a side close to the base substrate is larger than a size of a cross section of the second opening structure at another side away from the base substrate.

4. The mother plate according to claim 3, wherein the size of the cross section of the second opening structure at the other side away from the base substrate is larger than the size of the cross section of the first opening structure at the other side away from the base substrate.

5. The mother plate according to claim 3, wherein a size of a cross section of the third opening structure at a side close to the base substrate is equal to a size of a cross section of the third opening structure at another side away from the base substrate.

6. The mother plate according to claim 5, wherein the first opening structure corresponds to a blue sub-pixel, the second opening structure corresponds to a green sub-pixel, and the third opening structure corresponds to a red sub-pixel.

7. The mother plate according to claim 2, wherein a size of a cross section of the third opening structure at a side close to the base substrate is equal to a size of a cross section of the third opening structure at another side away from the base substrate.

8. The mother plate according to claim 7, wherein the first opening structure corresponds to a blue sub-pixel, the second opening structure corresponds to a green sub-pixel, and the third opening structure corresponds to a red sub-pixel.

9. The mother plate according to claim 1, wherein at least a fourth opening structure, a fifth opening structure and a sixth opening structure are formed in the second region, the fourth opening structure, the fifth opening structure and the sixth opening structure correspond to sub-pixels of different colors respectively, and a size of a cross section of the fourth opening structure at a side close to the base substrate is smaller than a size of a cross section of the fourth opening structure at another side away from the base substrate.

10. The mother plate according to claim 9, wherein a size of a cross section of the fifth opening structure at a side close to the base substrate is smaller than a size of a cross section of the fifth opening structure at another side away from the base substrate.

11. The mother plate according to claim 10, wherein the size of the cross section of the fifth opening structure at the other side away from the base substrate is smaller than the size of the cross section of the fourth opening structure at the other side away from the base substrate.

12. The mother plate according to claim 10, wherein a size of a cross section of the sixth opening structure at a side close to the base substrate is equal to a size of a cross section of the sixth opening structure at another side away from the base substrate.

13. The mother plate according to claim 9, wherein a size of a cross section of the sixth opening structure at a side close to the base substrate is equal to a size of a cross section of the sixth opening structure at another side away from the base substrate.

14. The mother plate according to claim 13, wherein the sixth opening structure corresponds to a red sub-pixel, the fifth opening structure corresponds to a green sub-pixel, and the fourth opening structure corresponds to a blue sub-pixel.

15. The mother plate according to claim 1, wherein in the first region, the size of the cross section of the at least one opening structure at the side close to the base substrate is larger than the size of the cross section of the at least one opening structure at the other side away from the base substrate, and a chamfered edge is arranged at the other side of the at least one opening structure away from the base substrate.

16. The mother plate according to claim 15, wherein
a width of the chamfered edge in a direction parallel to the base substrate is about 20% to 50% of the thickness of the black matrix in a direction perpendicular to the base substrate; and
a thickness of the chamfered edge in the direction perpendicular to the base substrate is about 20% to 100% of the thickness of the black matrix in the direction perpendicular to the base substrate.

17. The mother plate according to claim 1, wherein in the second region, the size of the cross section of the at least one opening structure at the side close to the base substrate is smaller than the size of the cross section of the at least one opening structure at the other side away from the base substrate, and a protruding edge is arranged at the other side of the at least one opening structure away from the base substrate.

18. The mother plate according to claim 17, wherein a cross section of the protruding edge is of a triangle.

19. The mother plate according to claim 18, wherein
a width of the protruding edge extending beyond the opening structure is about 20% to 50% of a thickness of the black matrix in a direction perpendicular to the base substrate; and
a thickness of the protruding edge in the direction perpendicular to the base substrate is about 20% to 100% of the thickness of the black matrix in the direction perpendicular to the base substrate.

20. The mother plate according to claim 1, wherein a cross section of the black matrix defining the opening structures in the direction perpendicular to the base substrate is of a trapezium, a curved shape or a triangle.

\* \* \* \* \*